United States Patent [19]

Kurei et al.

[11] 4,313,662
[45] Feb. 2, 1982

[54] SELF-TIMER DEVICE

[75] Inventors: Hiroshi Kurei, Kawagoe; Tahei Morisawa, Matsudo, both of Japan

[73] Assignee: Asahi Kogaku Kogyo Kabushiki Kaisha, Tokyo, Japan

[21] Appl. No.: 112,984

[22] Filed: Jan. 17, 1980

[30] Foreign Application Priority Data

Feb. 26, 1979 [JP] Japan .............................. 54-24014[U]

[51] Int. Cl.³ ........................ G03B 9/64; G03B 17/38
[52] U.S. Cl. .................................... 354/237; 354/238; 354/266
[58] Field of Search ............... 354/237, 238, 239, 240, 354/266, 268

[56]  References Cited
U.S. PATENT DOCUMENTS

| | | | |
|---|---|---|---|
| 3,581,642 | 6/1971 | Nomura | 354/237 |
| 3,625,128 | 12/1971 | Nomura | 354/237 |
| 3,713,373 | 1/1973 | Sato | 354/239 |
| 3,921,187 | 11/1975 | Kobori et al. | 354/237 |
| 4,112,448 | 9/1978 | Nakamura et al. | 354/239 |

FOREIGN PATENT DOCUMENTS 54-115222  9/1979  Japan .................................. 354/237

*Primary Examiner*—Russell E. Adams
*Attorney, Agent, or Firm*—Sughrue, Mion, Zinn et al.

[57] ABSTRACT

A self-timer device for a camera in which the set lever of an electronic self-timer device may be automatically restored and in which, even if the self-timer device has been set, it can be reset so that it is possible to perform an ordinary photographing operation. The device includes a self-timer set lever and a first cam rigidly coupled thereto with a bent portion standing away from the set lever and abutting a cam surface of a second cam member. The second cam member, upon being released by activation of a release button, is rotatable by the self-timer set lever through the bent portion of the first cam member rotating until it is locked in position by a locking lever. An operating member is provided which is activatable by a release lever which upon activation releases the second cam member. The bent portion of the first cam member also abuts a control switch of the electronic control circuit including an electrical delay circuit for providing a preferred delay time.

7 Claims, 5 Drawing Figures

SELF-TIMER DEVICE

BACKGROUND OF THE INVENTION

The present invention relates to a device for automatically restoring the self-timer set lever in an electronic self-timer device in a camera.

In a conventional mechanical self-timer device, the delay governor is charged with a drive force by setting its lever to the operating position after which the set lever is gradually restored by operation of the governor.

On the other hand, an electronic self-timer device can be set merely by operating its switch. Accordingly, even after executing a photographing operation, the setting of the electronic self-timer device is not automatically released or the electronic self-timer device is maintained set. Therefore, if one forgets to reset the electronic self-timer device, then a self-timer operated photographing operation is carried out even if the photographer intends to perform an ordinary photographing operation. Accordingly, it is necessary to provide an automatic restoring mechanism for such an electronic self-timer device in order to prevent such erroneous photographing operations.

Accordingly, an object of the invention is to provide a device which is simple in construction and is capable of automatically restoring the set lever of an electronic self-timer device and in which, even if the self-timer device has been set, it can be reset so that the self-timer device can be reset during the operation thereof making it possible to perform an ordinary photographing operation.

SUMMARY OF THE INVENTION

This, as well as other objects of the invention, may be met by a self-timer device for a camera including a self-timer set lever, a first cam member rigidly coupled to the set lever with the first cam member including a bent portion extending longitudinally away from the set lever, a locking member, a second cam member, a shaft and a release button rigidly coupled to the second cam member, a stationary pin positioned adjacent to and parallel to the shaft, and a self-timer switch. The self-timer lever, the first and second cam members, the shaft and release button, the stationary pin and the self-timer switch are positioned such that, prior to the depression of the release button, a first cam surface of the second cam member abuts the stationary pin to hold the second cam member in position while upon depression of the release button the cam member moves beyond an edge of the stationary pin and is released therefrom. The bent portion of the first cam member abuts a second cam surface of the second cam member. The self-timer switch is activated by rotation of the first cam member and the bent portion while the locking member engages a third cam surface of the second cam member to hold the second cam member at a set position.

There may further be included an operating member which is activatable by a release lever with the operating member upon activation releasing the second cam member. In preferred embodiments, the first cam member is provided with first and second cam surfaces which cooperate with the stationary pin for defining limits upon the angle of rotation of the first cam member. A cylindrical member may be provided for rigidly coupling the first cam member to the self-timer set lever with the shaft positioned within a longitudinal passage in the cylindrical member. Also, there is preferably provided a first spring for radially biasing the bent portion of the first cam member away from the second cam surface of the second cam member and a spring for longitudinally biasing the release button outwardly. The self-timer switch coupled to an electronic self-timer circuit includes an electrical delay circuit for providing a delay time.

BRIEF DESCRIPTION OF THE DRAWINGS

More specifically, FIG. 2 shows a state of the self-timer set lever in which the self-timer is not operated.

FIG. 3 shows a state of the self-timer set lever in which the self-timer has been activated.

FIG. 4 shows a state of the self-timer set lever in which the self-timer is reset.

DESCRIPTION OF THE PREFERRED EMBODIMENTS

Figure 1:
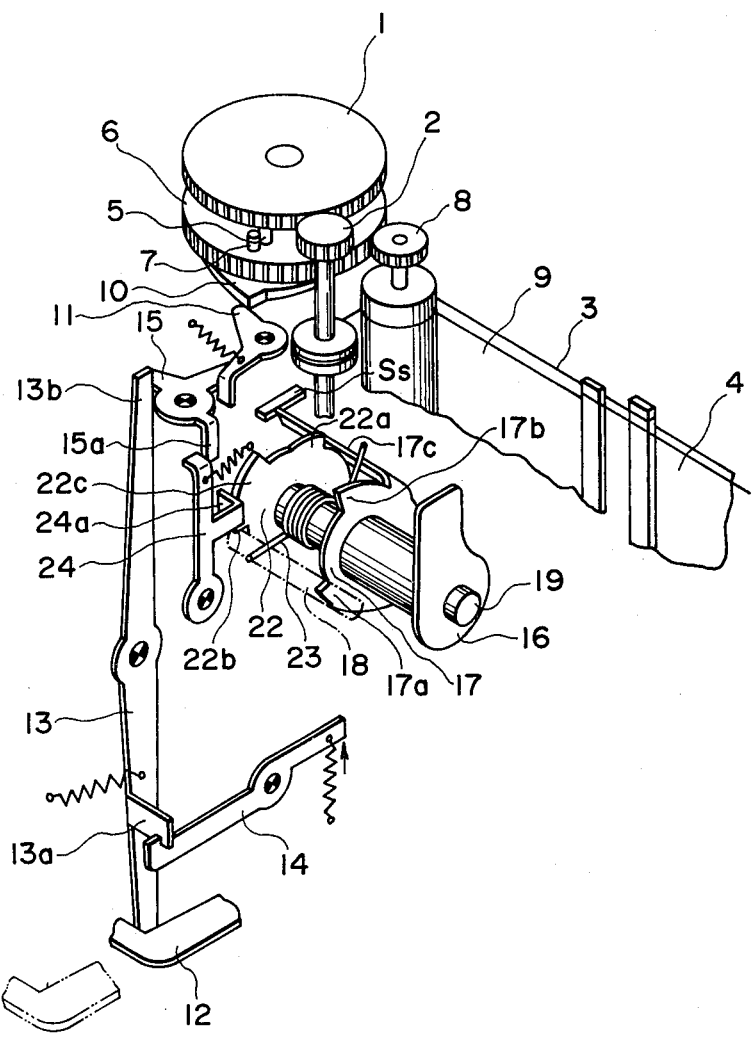
FIG. 1 is a perspective view showing the essential components of a self-timer device according to the invention.

A preferred embodiment of the invention will be described with reference to the accompanying drawings. In FIG. 1, an upper speed change gear 1 is turned clockwise by a winding operation so that the top curtain 4 is charged with running energy through a pulling element 3 by a top curtain pinion 2 engaged with the gear 1. On the other hand, a lower speed change gear 6 is turned by means of pins 5 and 7 which are fixedly secured to the upper and lower speed change gears 1 and 6, respectively, so that the bottom curtain 9 is charged with running energy by a bottom curtain pinion 8. Upon completion of the winding operation, a top curtain locking cam 10 integral with the upper speed change gear 1 is engaged with a top curtain locking lever 11. In association with the winding operation, a charge lever 12 is operated to turn a release lever 13 counterclockwise as a result of which a bent portion 13a protruding from the release lever 13 engages with a locking lever 14. Thereafter, the charge lever 12 is returned to a position indicated by the dot-chain line in FIG. 1.

Figure 5:
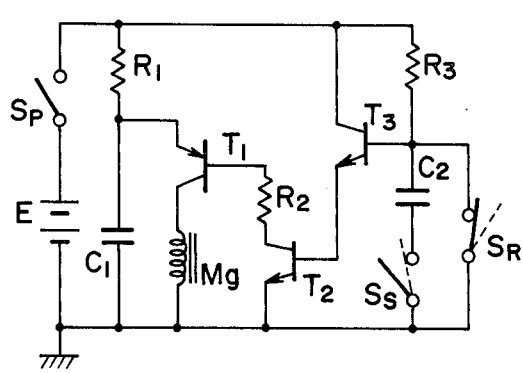
FIG. 5 is a circuit diagram showing an electronic self-timer.

FIG. 5 shows an electronic self-timer circuit. A power switch $S_p$ is turned on by the first step in depression of a shutter release button (not shown) to supply current to the circuit from a power source E. A release switch $S_R$ is turned off by the second step in depression of the shutter release button. These two switches are self-held until the photographing operation is completed (the mechanism for the holding function not being shown).

In the case of an ordinary photographing operation not using the self-timer, a self-timer switch $S_S$ is maintained turned off. Therefore, a self-timer capacitor $C_2$ remains uncharged while transistors $T_3$, $T_2$ and $T_1$ are rendered conductive in the stated order. Accordingly, at the instant when the power switch $S_p$ is turned on, a release capacitor $C_1$, which has been charged through a resistor $R_1$, is discharged through the transistor $T_1$ energizing a release magnet Mg which is designed to cancel the magnetic force of a permanent magnet (not shown). As a result, the armature, which was attracted in the winding operation, is released so that the locking of a mirror operating mechanism (not shown) is released and the mirror is lifted.

At the end of the mirror lifting operation, the locking lever 14 is turned counterclockwise and is therefore disengaged from the release lever 13. Accordingly, the release lever 13 is turned clockwise causing its end portion 13b to turn a relay lever 15. Therefore, the top curtain locking lever 11 is turned counterclockwise and is therefore disengaged from the top curtain locking cam 10 so that the top curtain 4 is run. The exposure operation is then carried out upon releasing the bottom curtain 9 with a shutter speed control device (not shown).

If the camera is to be operated with the self-timer, the self-timer switch $S_S$ is turned on in association with the setting of a self-timer set lever which is described later with reference to FIGS. 1 and 2. Therefore, when the release switch $S_R$ is turned off, the self-timer capacitor $C_2$ and a resistor $R_3$ form an RC circuit and the self-timer capacitor $C_2$ is gradually charged. The resistance and capacitance values of the RC circuit are so selected that the voltage of the capacitor $C_2$ renders the transistor $T_3$ conductive in about ten seconds (delay time). When the transistor $T_3$ is rendered conductive, the circuit operates as described above to energize the release magnet MG whereby the exposure operation is executed.

Described above has been an ordinary electronic self-timer mechanism. Next, an automatic restoring mechanism of a self-timer set lever provided in accordance with the present invention will be described.

Figure 2:
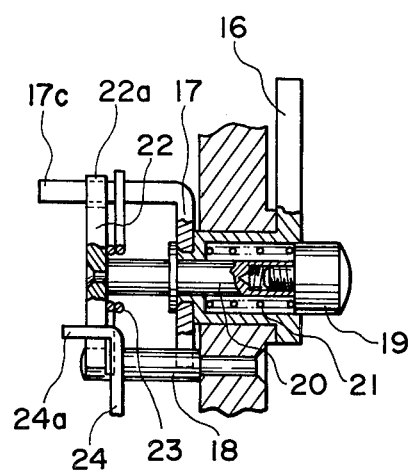
FIGS. 2 through 4 are sectional views of a self-timer set lever.

Referring to FIGS. 1 and 2, a regulating plate 17 is provided integrally with the self-timer set lever 16. The regulating plate 17 has regulating portions 17a and 17b. A stationary pin 18 is inserted between the regulating portions 17a and 17b to define the range of rotation of the set lever 16. A release button 19 is fixedly secured to a shaft 20 which is inserted into a cylindrical hollow part of the set lever 16. A spring 21 is positioned in the cylindrical hollow part so that the release button 19 is pushed to the right as viewed in FIG. 2 by the spring 21 at all times. A cam plate 22 is fixedly secured to the shaft 20. The cam plate 22 has a fork 22a which is engaged with a bent portion 17c protruding from the regulating plate 17. That is, the assembly of the regulating plate 17 and the set lever 16 and the assembly of move as a single unit in the rotational direction, but they move freely from each other in the thrust or axial direction. The shaft 20 is provided with a torsion spring 23 so that the self-timer set lever 16 is biased in the clockwise direction at all times. However, it should be noted that the position of the set lever 16 is regulated because the regulating portion 17a is engaged with the stationary pin 18.

The self-timer can be set by turning the set lever 16 counterclockwise. However, in an electronic self-timer device, unlike a conventional mechanical self-timer device, it is unnecessary to energize the drive spring of the governor so that the set lever 16 can be turned with only a slight force. That is, the set lever 16 may be turned carelessly. In order to prevent this, a protrusion 22b is provided extending from the cam plate 22 at a position such that it is engaged with the stationary pin 18.

Figure 3:
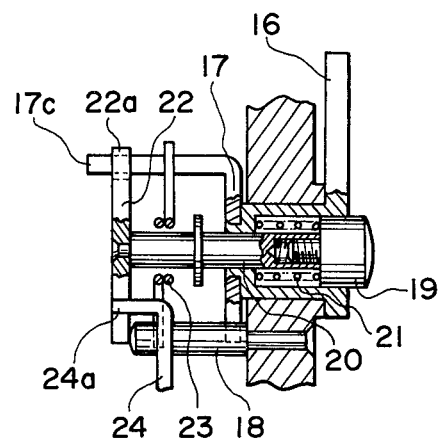
Figure 4:
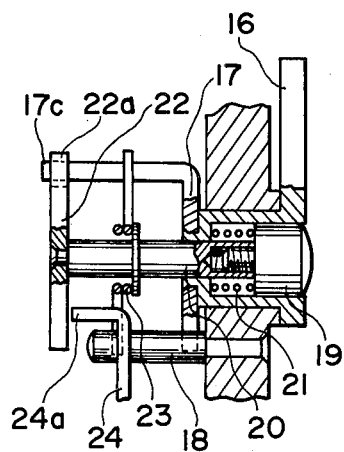

When the release button 19 is depressed to the left against the spring 21 as shown in FIG. 3, the cam plate 22 slides to the left with a positional relationship between the cam plate 22 and the regulating plate 17 in the radial direction maintained unchanged by the bent portion 17c. As a result, the cam plate 22 disengages from the stationary pin 18 so that the self-timer set lever 16 can be turned counterclockwise, that is, the self-timer can be set.

When, under the conditions shown in FIG. 1, the set lever 16 is turned counterclockwise, the locking portion 22c of the cam plate 22 engages with the bent portion 24a of a locking lever 24 as a result of which the set lever 16 is locked. When, in this condition, the release button 19 is released, the cam plate 22 is moved to the right by the spring 21 until it abuts against the end portion of the stationary pin 18. In this operation, the bent portion 17c of the regulating plate 17 turns on the self-timer switch $S_S$. Thus, when the top curtain 4 is released with the electrical time delay as described above, one end portion 15a of the relay lever 15 kicks the locking lever 24 turning the locking lever 24 counterclockwise. Therefore, the cam plate 22 is disengaged, and the self-time set lever 16 is restored by a spring 23. At the same time, the cam plate 22 is released from the stationary pin 18 and the release button 19 is therefore restored.

In the case that it is desired to suspend the photographing operation using the self-timer after the self-timer has been set, the following steps should be followed. First, the release button 19 is further depressed against the elastic force of the spring 21 so that the cam plate 22 is disengaged from the locking lever 24 in the axial direction. Then, the self-timer set lever 16 is restored by turning it clockwise by force of the torsion spring 23 and the self-timer switch $S_S$ is also restored. In this manner an ordinary photographing operation without using the self-timer can be carried out.

In the case when it is required to release the shutter during the delay time after the self-timer has been started, first the release button 19 is depressed. As a result, similar to the above-described case, the cam plate 22 is disengaged from the locking lever 24 in the axial direction restoring the self-timer set lever 16. Accordingly, the self-timer switch $S_S$ is turned off. Thus, the operation of the delay circuit of the self-timer is suspended and the transistor $T_1$ is instantly turned on to supply current to the release magnet Mg whereby the mirror is released. Thus, the photographing operation is carried out as described above.

As is clear from the above description, the present invention has a number of significant merits. The set lever of the electronic self-timer device is automatically restored. Therefore, the above-described difficulty attributed to forgetting to reset the self-timer device can be eliminated and the self-timer device can be used as means for visually indicating the completion of a photographing operation using the self-timer. The self-timer device can be reset merely by depressing the release button. Even when the self-timer is running, the operation thereof can be suspended to instantaneously take a picture.

What is claimed is:

1. A self-timer device for a camera comprising:
   an external self-timer set lever rotatably mounted on the outside of the camera;
   a first cam member rigidly coupled inside the camera to said set lever, said first cam member including a bent portion extending away from said set lever;
   a second cam member;
   a locking member mounted inside said camera;

an internal shaft and an external release button rigidly coupled to said second cam member, said shaft being rotatable with said set lever but axially movable relative thereto;

a stationary pin positioned adjacent to and parallel to said shaft; and a self-timer switch activatable by said bent portion; wherein:

said self-timer lever, said first and second cam members, said shaft and release button, said stationary pin and said self-timer switch are positioned such that, prior to depression of said release button, a first cam surface of said second cam member abuts said stationary pin, and upon depression of said release button said second cam member moves inwardly beyond an edge of said stationary pin and is released therefrom, said bent portion of said first cam member abutting a second cam surface of said second cam member, and, upon rotation of said self-timer lever to a set position and release of said button, said self-timer switch is activated by said bent portion to start a time delay, said locking member engaging a third cam surface of said second cam member to hold said self-timer lever at the set position.

2. The self-timer device of claim 1 further comprising an operating member activatable by a release lever, said operating member upon activation releasing said second cam member.

3. The self-timer device of claim 1 wherein said first cam member is provided with first and second cam surfaces cooperating with said stationary pin for defining limits upon the angle of rotation of said first cam member.

4. The self-timer device of claim 1 further comprising a cylindrical member rigidly coupling said first cam member to said self-timer set lever and said shaft being positioned within said longitudinal passage in said hollow cylindrical member.

5. The self-timer device of claim 1 further comprising:

a first spring for radially biasing said bent portion of said first cam member away from said second cam surface of said second cam member; and a second spring for longitudinally biasing said release button outwardly.

6. The self-timer device of any of claims 1 to 5 further comprising an electronic self-timer circuit operatively coupled to said self-timer switch.

7. The self-timer device of claim 1 further comprising means responsive to release of the camera shutter at the end of said time delay to release said locking member and restore said self-timer lever and said release button to their original positions.

* * * * *